US008345626B2

(12) United States Patent
Noh

(10) Patent No.: US 8,345,626 B2
(45) Date of Patent: Jan. 1, 2013

(54) HANDOVER METHOD FOR MINIMIZING PACKET CALL RECONNECTION DELAY TIME BETWEEN DIFFERENT MOBILE COMMUNICATION SCHEMES AND MULTI-MODE TERMINAL FOR THE SAME

(75) Inventor: Jeong-Min Noh, Seoul (KR)

(73) Assignee: Samsung Electronics Co., Ltd (KR)

( * ) Notice: Subject to any disclaimer, the term of this patent is extended or adjusted under 35 U.S.C. 154(b) by 869 days.

(21) Appl. No.: 11/698,771

(22) Filed: Jan. 26, 2007

(65) Prior Publication Data
US 2007/0195733 A1 Aug. 23, 2007

(30) Foreign Application Priority Data
Jan. 26, 2006 (KR) .................. 10-2006-0008549

(51) Int. Cl.
*H04W 4/00* (2009.01)
*H04J 3/17* (2006.01)
*H04J 4/00* (2006.01)
*H04J 3/16* (2006.01)
*H04L 12/40* (2006.01)

(52) U.S. Cl. ........ 370/331; 370/332; 370/333; 370/334; 455/435.1; 455/436; 455/437; 455/438; 455/439

(58) Field of Classification Search .......... 370/331–334, 370/91; 455/425, 435.1–435.3, 436–444, 455/550.1, 552.1, 553
See application file for complete search history.

(56) References Cited

U.S. PATENT DOCUMENTS

| 6,445,917 | B1* | 9/2002 | Bark et al. ................... 455/423 |
| 2001/0016482 | A1* | 8/2001 | Bergstrom et al. ........... 455/332 |
| 2003/0114158 | A1* | 6/2003 | Soderbacka et al. .......... 455/436 |
| 2005/0128980 | A1 | 6/2005 | Han et al. |
| 2005/0221824 | A1* | 10/2005 | Lee et al. ................... 455/435.2 |
| 2005/0236654 | A1 | 10/2005 | Kijima et al. |
| 2005/0250498 | A1* | 11/2005 | Lim et al. ..................... 455/436 |
| 2006/0126564 | A1* | 6/2006 | Ramanna et al. ............. 370/331 |

FOREIGN PATENT DOCUMENTS

| CN | 1620182 | 5/2005 |
| CN | 1691332 | 11/2005 |
| KR | 1020040049124 A | 6/2004 |
| KR | 1020050046835 A | 5/2005 |
| KR | 1020050102370 A | 10/2005 |
| KR | 1020060032700 A | 4/2006 |
| KR | 1020060060784 A | 6/2006 |
| KR | 1020060663316 A | 6/2006 |
| WO | WO 2005114875 A1 * | 12/2005 |

* cited by examiner

*Primary Examiner* — Marisol Figueroa
*Assistant Examiner* — Dung Hong
(74) *Attorney, Agent, or Firm* — The Farrell Law Firm, P.C.

(57) ABSTRACT

Provided is a function of minimizing a delay time of a packet call disconnect due to a handover between communication networks providing a communication service using different mobile communication technologies. To do this, even though a handover situation is generated during a packet service, the packet service is continuously provided by maintaining a current mode and performing a mode change after registration in a handover target network succeeds. Accordingly, since the packet service is not provided only while a packet call connecting process is performed, a delay time according to a packet call reconnection can be minimized.

18 Claims, 6 Drawing Sheets

HANDOVER METHOD FOR MINIMIZING PACKET CALL RECONNECTION DELAY TIME BETWEEN DIFFERENT MOBILE COMMUNICATION SCHEMES AND MULTI-MODE TERMINAL FOR THE SAME

PRIORITY

This application claims priority under 35 U.S.C. §119 to an application entitled "Handover Method for Minimizing Packet Call Reconnection Delay Time between Different Mobile Communication Schemes and Multi-Mode Terminal for The Same" filed in the Korean Intellectual Property Office on Jan. 26, 2006 and assigned Serial No. 2006-8549, the contents of which are incorporated herein by reference.

BACKGROUND OF THE INVENTION

1. Field of the Invention

The present invention relates generally to a handover method for minimizing a packet call reconnection delay time between different mobile communication schemes when a packet call is disconnected due to a handover between communication networks providing a communication service using different mobile communication technologies and a multi-mode terminal for the same.

2. Description of the Related Art

Recently, mobile communication networks are being upgraded from second generation (2G) networks, such as code division multiple access (CDMA) networks and European global systems for mobile communication (GSM) networks, to third generation (3G) networks such as wideband CDMA (WCDMA) networks. Since service areas using 2G schemes are widely distributed and their infrastructures are completely equipped at the present time, while the infrastructures of the 2G networks are transitionally used, areas in which the 3G networks are installed are gradually widening. Thus, in this transitional state, terminals designed to support services specified to the 3G networks are manufactured as multi-mode terminals to also support the existing 2G schemes.

Some main characteristics of such a multi-mode terminal are an idle handover function for changing to a CDMA mode or a WCDMA mode, a traffic handover function for seamlessly changing to the CDMA mode when the multi-mode terminal moves to a WCDMA shadow area while engaged in communication, and a packet call reconnection function for reconnecting a packet type data call by changing to the CDMA mode or the WCDMA mode when a handover occurs. Although these functions are economical because an existing 2G CDMA network can be used, since the multi-mode terminal must quickly perform a handover between different modems, hardware and software implementation of the multi-mode terminal is complicated.

FIG. 1 is a signaling diagram illustrating an operation of a multi-mode terminal performing the packet call reconnection function.

Referring to FIG. 1, in response to a packet service connection request from a user, an application processor, i.e., a controller 30 transmits a Packet-Switched (PS) CALL ORIGINATION message to a WCDMA modem 20 in step 100. In response to the PS CALL ORIGINATION message, the WCDMA modem 20 sequentially transmits a GPRS (General Packet Radio Service) Mobility Management (GMM) SERVICE REQUEST message in step 105 and an ACTIVATE Packet Data Protocol (PDP) CONTEXT REQUEST message in step 110 to a WCDMA Base Transceiver Station (BTS) 10 and receives an ACTIVATE PDP CONTEXT RESPONSE message from the WCDMA BTS 10 in step 115. In this case, the service request is achieved through protocol layer GMM. Then, the WCDMA modem 20 recognizes that a packet call is connected through the ACTIVATE PDP CONTEXT RESPONSE message and transmits a CALL CONNECT message to the controller 30 in step 120. Accordingly, a packet type path (packet bearer) is established in step 130.

However, if the multi-mode terminal moves to a shadow area or a boundary area in the middle of packet data transmission, the multi-mode terminal may not communicate with the WCDMA BTS 10, thereby occurring a radio link failure state in step 140. Then, to reconnect a packet call from a WCDMA network to a CDMA network, the multi-mode terminal must disconnect the packet call from the WCDMA network, change to a handover target mode, and reconnect a packet call to the CDMA network. Accordingly, the WCDMA modem 20 activates a timer, and if the timer expires, the WCDMA modem 20 transmits a RADIO LINK FAILURE INDICATION message to the controller 30 in step 145. Then, a mode change, such as a switching process, is performed to change to the CDMA mode under the control of the controller 30 in step 150. Then, a CDMA modem 40 establishes a packet type path (packet bearer) with a CDMA BTS 50, which is a handover target network, in step 155 by connecting to the CDMA BTS 50. As described above, a delay because of the reconnection occurs before the packet type path (packet bearer) with the handover target network is established after the radio link failure. It is important in the packet call reconnection function to reduce the delay time of the reconnection process.

FIG. 2 is a flowchart illustrating a process of disconnecting a radio link among the process described in FIG. 1.

Referring to FIG. 2, in a packet call connection state, if a radio link between the WCDMA BTS 10 and the WCDMA modem 20 is disconnected in step 200, a physical layer 22 of the WCDMA modem 20 transmits an OUT-OF-SYNC message to a radio source control layer 24, which is an upper layer of the physical layer 22, in step 205. The radio source control layer 24 determines in step 210 whether the number of received OUT-OF-SYNC messages is N313, and if N313 OUT-OF-SYNC messages are consecutively received, the radio source control layer 24 activates a T313 timer in step 215. The physical layer 22 consecutively transmits an IN-SYNC message to the radio source control layer 24 in step 220, and the radio source control layer 24 determines in step 225 whether the T313 timer expires. If N315 IN-SYNC messages have not been received when the T313 timer expires, the radio source control layer 24 generates a RADIO LINK FAILURE event in step 230 and disconnects a relevant packet call. Thus, the multi-mode terminal performs nothing during a NO SERVICE period until the multi-mode terminal generates the RADIO LINK FAILURE event based on N313, T313, and N315 in a shadow area. Herein, since N313, T313, and N315, which are reference values used to define RADIO LINK FAILURE in WCDMA, are included in a System Information Base (SIB) 1 provided by a WCDMA BTS when the multi-mode terminal in the WCDMA mode registers in the WCDMA BTS and are defined in the standard, a detailed description is omitted.

As described above, if a radio link is disconnected, only after a packet call is successfully connected to a handover target network, can the user use a packet service again. That is, a delay time for which the user cannot use the packet service occurs from when communication with a WCDMA BTS in the WCDMA mode is disconnected to when a packet call is reconnected in the CDMA mode. The delay time is around 20~40 seconds including a network state, parameters defined in SIB1, and a switching time in a mode change. Although the packet call reconnection function has an advantage that the user does not have to directly perform a reconnection process, since the user cannot use a service for a very long time, the multi-mode terminal may seem to be in a malfunctioning state.

As described above, conventionally, it is important to perform a handover without disconnecting a packet call when the handover is required in a multi-mode terminal communicating with networks using different mobile communication technologies, e.g., a CDMA network and a WCDMA network. Accordingly, when a packet call is disconnected due to a handover in a conventional dual-mode terminal, an application in use can no longer provide a service. Thus, to continuously use a previous service, a packet call reconnection is performed. However, a delay time according to the packet call reconnection may be as long as around 20~40 seconds, and a user must wait with a fixed screen image until a packet call is reconnected, thereby causing great inconvenience to the user.

SUMMARY OF THE INVENTION

An aspect of the present invention is to substantially solve at least the above problems and/or disadvantages and to provide at least the advantages below. Accordingly, an aspect of the present invention is to provide a handover method for minimizing a packet call reconnection delay time between different mobile communication schemes when a packet call is disconnected due to a handover between communication networks providing a communication service using different mobile communication technologies and a multi-mode terminal for the same.

According to one aspect of the present invention, there is provided a method of minimizing a delay time according to a packet call reconnection in a multi-mode terminal that includes first and second modems supporting different communication services, the method includes receiving a condition for beginning a packet call reconnection to a second communication network from a first communication network during a packet service through the first communication network; determining whether the received packet call reconnection start condition is satisfied by monitoring a state of the packet service through the first communication network; and if the packet call reconnection start condition is satisfied, reconnecting a packet call to the second communication network to perform the packet service.

According to another aspect of the present invention, there is provided a multi-mode terminal, which includes first and second modems supporting different communication services, for minimizing a delay time according to a packet call reconnection, the first modem for receiving a condition for beginning a packet call reconnection to a second communication network from a first communication network during a packet service through the first communication network, determining whether the received packet call reconnection start condition is satisfied by monitoring a state of the packet service through the first communication network, and commanding the second modem to reconnect a packet call to the second communication network if the packet call reconnection start condition is satisfied; and the second modem for registering into the second communication network in response to the command of the first modem and connecting the packet call to the second communication network to perform the packet service if the registration succeeds.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

Figure 1:
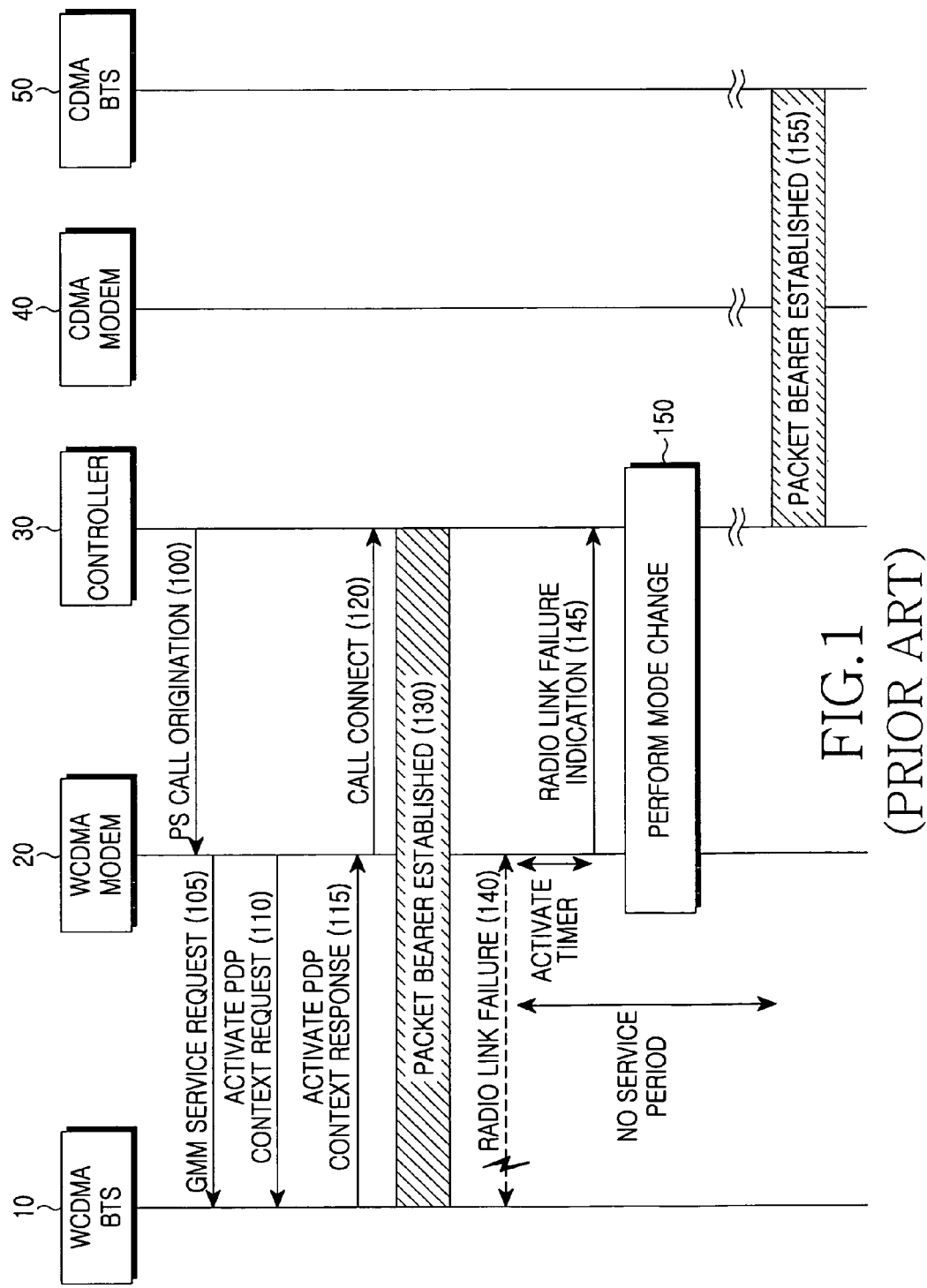
FIG. 1 is a signaling diagram illustrating a process of performing a conventional packet call reconnection function.
Figure 2:
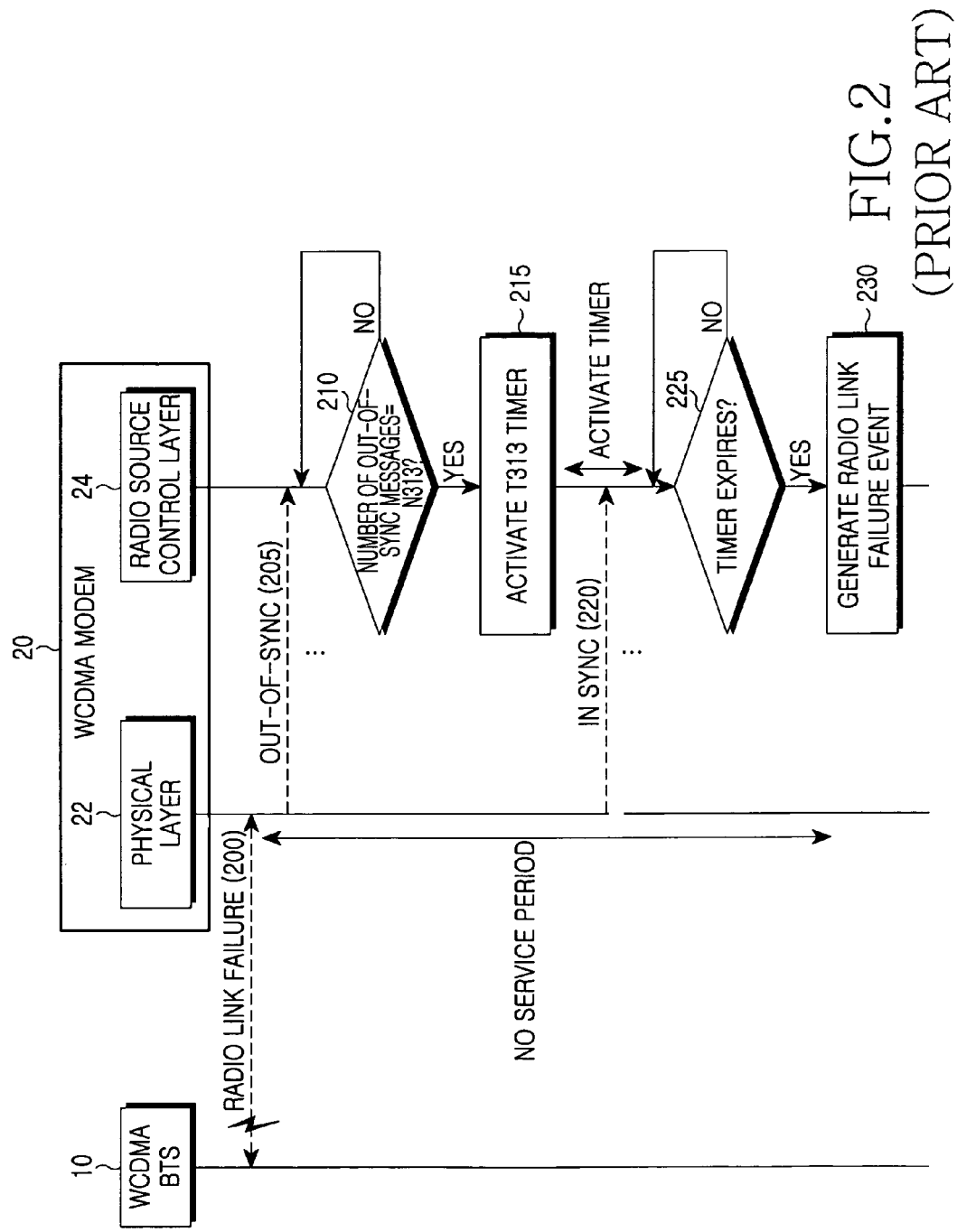
FIG. 2 is a flowchart illustrating a process of disconnecting a radio link in FIG. 1.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

The present invention implements a function of minimizing a delay time according to a packet call disconnection when a handover occurs between communication networks providing a communication service using different mobile communication technologies. To do this, even though a handover situation is generated during a packet service, a multi-mode terminal maintains a current mode, and only after registration into a handover target network succeeds, will the multi-mode terminal continuously provide the packet service by changing a communication network mode. According to the present invention, since a service is not provided only while a packet call is being reconnected, a delay time according to a packet call disconnection can be minimized.

Components and the operations of a multi-mode terminal according to the present invention in which the above-described function is realized will now be described with reference to FIG. 3. In particular, CDMA and WCDMA are illustrated as the different mobile communication technologies, and more particularly, a handover operation from a WCDMA mode to a CDMA mode will be described. Herein, CDMA, which is one of the mobile communication technologies, can be replaced with GSM.

The multi-mode terminal supporting the WCDMA mode and the CDMA mode includes a WCDMA modem 350 and a CDMA modem 340 for operating in respective modes. The CDMA modem 340 and the WCDMA modem 350 are connected through a communication path 360 for intercommunication.

Figure 3:
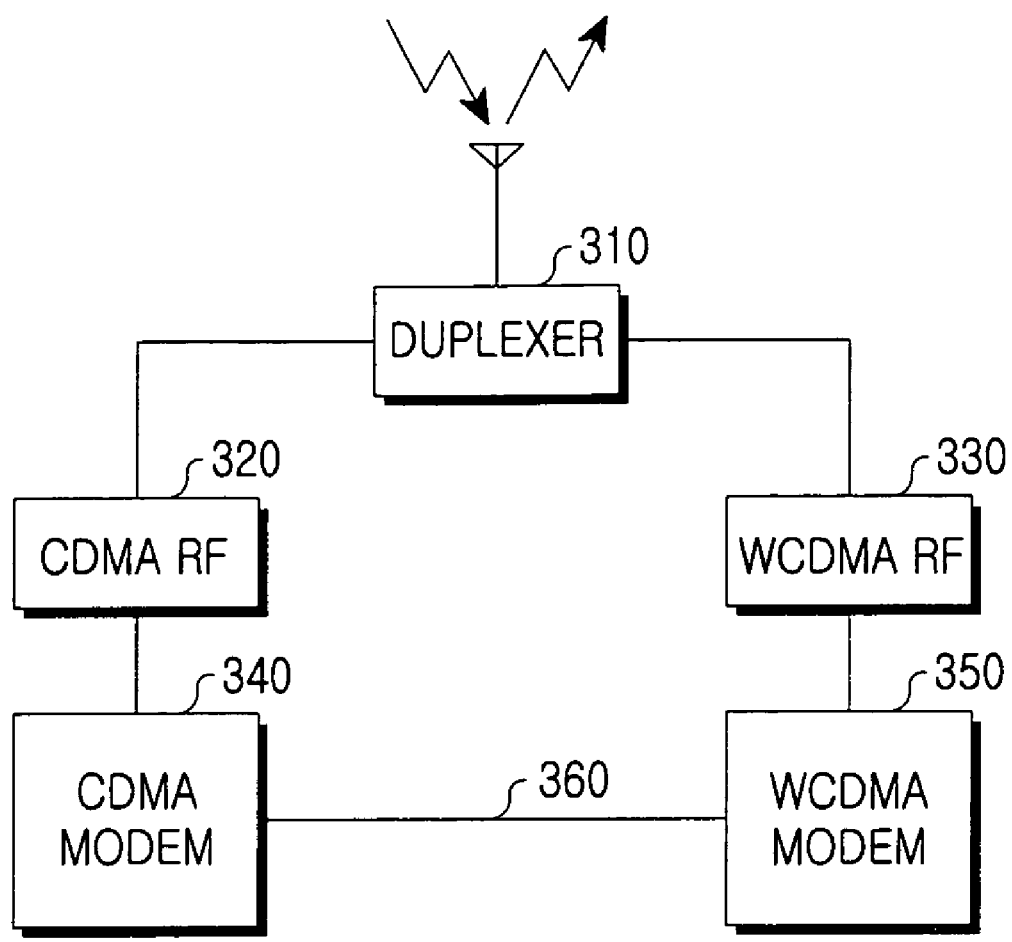
FIG. 3 is a block diagram of a multi-mode terminal according to the present invention.

In detail, the multi-mode terminal, which has a configuration illustrated in FIG. 3, includes an antenna for transmitting and receiving WCDMA signals and CDMA signals, a duplexer 310 for separating the WCDMA signals and the CDMA signals transmitted and received through the antenna, a CDMA radio frequency (RF) module 320 and a WCDMA RF module 330 for processing the CDMA signals and the WCDMA signals, respectively. The CDMA modem 340 and the WCDMA modem 350 also process the CDMA signals and the WCDMA signals transmitted and received through the CDMA RF module 320 and the WCDMA RF module 330, respectively. Each of the CDMA modem 340 and the WCDMA modem 350 may be a single chip or a digital signal processor (DSP) in the modem chip.

A multi-mode terminal structure of FIG. 3 is an illustration of components for a single antenna. Thus, if the multi-mode terminal having the configuration illustrated in FIG. 3 is located in a WCDMA network, only the CDMA RF module 320 is temporarily in a power-off state, and the antenna, the duplexer 310, the WCDMA RF module 330, and the WCDMA modem 350 are in a power-on state. Thus, the multi-mode terminal operates in the WCDMA mode. If the multi-mode terminal is located in a CDMA network, since only the WCDMA RF module 330 is temporarily in the power-off state, the multi-mode terminal operates in the CDMA mode. In this case, the WCDMA modem 350 plays a role of a processor for communicating with a user by receiving data from the CDMA modem 340 through the communication path 360.

As described above, by realizing the internal communication path 360 between the CDMA modem 340 and the WCDMA modem 350, when a packet call reconnection event from WCDMA to CDMA is generated, intercommunication between the CDMA modem 340 and the WCDMA modem 350 can be performed. That is, since the WCDMA modem 350 can directly transmit a command to the CDMA modem 340, an additional application processor, i.e., a controller, for controlling the two modems 340 and 350 is not required. Thus, to operate in a particular mode, each of the two modems 340 and 350 includes a user interface part and a device control part. Accordingly, the WCDMA modem 350 and the CDMA modem 340 operate as a master and a slave, respectively. As described above, since the CDMA modem 340 and the WCDMA modem 350 are always connected using the 1:1 communication path 360, a switching process between modems is not required, thereby reducing a handover processing time and having a simpler structure.

Figure 4:
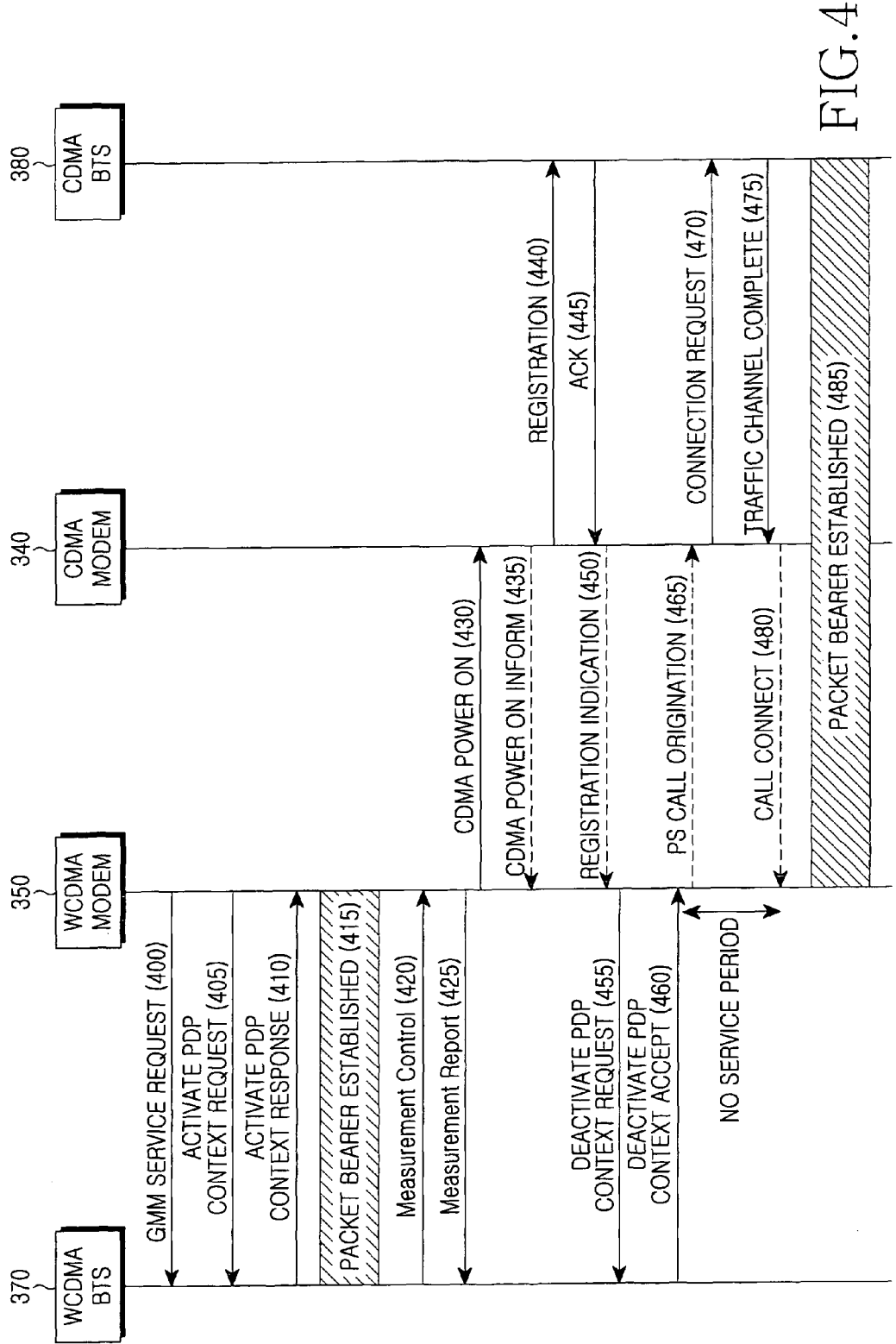
FIG. 4 is a signaling diagram illustrating a process of reconnecting a packet call according to the present invention.

A process of minimizing a delay time according to a packet call reconnection in a multi-mode terminal having the configuration described above will now be described. FIG. 4 is a signaling diagram illustrating a process of reconnecting a packet call. In FIG. 4, a case where the multi-mode terminal moves from a WCDMA network to a CDMA network is illustrated.

In detail, the multi-mode terminal is connected to a WCDMA BTS 370, and the WCDMA BTS 370 is connected to a server (not shown) providing a specific packet service through a backbone network. To transmit and receive packet data, a PDP context must be active between the multi-mode terminal and the WCDMA BTS 370. Herein, the meaning of activate PDP context, packet call establishment, and tunnel generation is the same. Thus, in response to a packet data service request from a user, the PDP context must be active in order for the user to perform packet data communication with the server providing a specific packet service through the WCDMA BTS 370.

Hereinafter, procedures for performing a General Packet Radio Service (GPRS) Mobility Management (GMM) data call processing process between the multi-mode terminal and networks are described. Herein, the call processing process is an activate PDP context process and is a process of processing packet data.

In response to a packet service connection request from the user, the WCDMA modem 350 transmits a GMM SERVICE REQUEST message to the WCDMA BTS 370 in step 400 and transmits an ACTIVATE PDP CONTEXT REQUEST message to the WCDMA BTS 370 in step 405. If the WCDMA modem 350 receives an ACTIVATE PDP CONTEXT RESPONSE message containing an IP address assigned for a packet call service from the WCDMA BTS 370 in step 410 in response to the ACTIVATE PDP CONTEXT REQUEST message, a packet service starts by establishing a packet type path (packet bearer) using the assigned IP address in step 415.

During the packet service, whether a current wireless environment satisfies a handover condition is continuously monitored between the WCDMA modem 350 and the WCDMA BTS 370 in steps 420 and 425. In detail, the WCDMA BTS 370 transmits a MEASUREMENT CONTROL message containing a condition for determining a packet call reconnection time to the WCDMA modem 350 in step 420. That is, the packet call reconnection start condition is a threshold defined by the WCDMA BTS 370 to determine when the multi-mode terminal operating in the WCDMA mode performs a packet call reconnection. The packet call reconnection start condition contained in the MEASUREMENT CONTROL message is largely composed of an intra frequency condition for an event generated in the same frequency, an inter frequency condition for an event generated in different frequencies, and an inter-RAT (radio access technology) for an event generated in different systems. In addition, the event condition can be variously set using a plurality of conditions and is defined in a third Generation Partnership Project (3GPP) 25.331 standard.

The WCDMA modem 350, which has received the MEASUREMENT CONTROL message, continuously monitors a packet service state through the WCDMA BTS 370. That is, the WCDMA modem 350 measures whether a current wireless environment satisfies the packet call reconnection start condition, and if the current wireless environment satisfies the packet call reconnection start condition, the WCDMA modem 350 transmits a MEASUREMENT REPORT message to the WCDMA BTS 370 in step 425. In other words, the WCDMA modem 350 receives a MEASUREMENT CONTROL message containing a packet call reconnection start condition defined under the mutual consent of service providers from the WCDMA BTS 370, and if the multi-mode terminal connects from the WCDMA BTS 370 to another WCDMA BTS, the WCDMA modem 350 receives a MEASUREMENT CONTROL message containing a new packet call reconnection start condition.

That is, the WCDMA modem 350 receives a MEASUREMENT CONTROL message from the WCDMA BTS 370 and continuously monitors a packet call reconnection start time in response to a command contained in the MEASUREMENT CONTROL message. If the packet call reconnection start condition is satisfied as the monitoring result, the WCDMA modem 350 transmits a MEASUREMENT REPORT message to the WCDMA BTS 370. That is, a MEASUREMENT REPORT message for informing that a packet service state of the multi-mode terminal requires a packet call reconnection is transmitted. In the current embodiment, when a MEASUREMENT REPORT message is transmitted to the WCDMA BTS 370, the multi-mode terminal begins a packet call reconnection.

For example, for a 1F or 2D event (referring to 3GPP 25.331) generated when the intensity of a reception signal measured by the WCDMA modem 350 is less than a threshold, since the event can be generated in a WCDMA boundary or shadow area, the multi-mode terminal can transmit the MEASUREMENT REPORT message and immediately begin the packet call reconnection. Thus, to transmit the MEASUREMENT REPORT message and immediately begin the packet call reconnection, the WCDMA modem 350 transmits a CDMA POWER ON message for turning on the CDMA modem 340 to the CDMA modem 340 through the communication path 360 in step 430.

When the CDMA POWER ON message is received, the CDMA modem 340 performs an initialization process and transmits to the WCDMA modem 350 a CDMA POWER ON INFORM message for informing that the CDMA modem 340 is turned on in step 435. Then, the CDMA modem 340 performs system registration using a conventional method in steps 440 and 445. That is, the CDMA modem 340 transmits a REGISTRATION message for registering in a CDMA network to a CDMA BTS 380 in step 440, and if an ACK message is received in step 445 in response to the REGISTRATION message, the CDMA modem 340 determines that the CDMA network registration succeeds. If the CDMA network registration succeeds, the CDMA modem 340 transmits a REGISTRATION INDICATION message for indicating registration success to the WCDMA modem 350 in step 450.

When the WCDMA modem 350 receives the REGISTRATION INDICATION message from the CDMA modem 340, the WCDMA modem 350 transmits this event to each application performing the packet call service, which is included in the multi-mode terminal. In step 455, the WCDMA modem 350 transmits a DEACTIVATE PDP CONTEXT REQUEST message for disconnecting a packet call with the WCDMA BTS 370 to the WCDMA BTS 370. In this case, the WCDMA modem 350 returns the IP address, which is an address for connecting to the server, assigned by the WCDMA network using the DEACTIVATE PDP CONTEXT REQUEST message.

When a DEACTIVATE PDP CONTEXT ACCEPT message for accepting a connection release from the WCDMA network is received from the WCDMA BTS 370 in step 460, the packet call between the WCDMA modem 350 and the WCDMA BTS 370 is released, i.e., disconnected, thereby temporarily stopping the packet service. If the packet call is disconnected, the WCDMA modem 350 transmits a PS CALL ORIGINATION message to the CDMA modem 340 in step 465. Then, the CDMA modem 340 performs a packet call connection to the CDMA BTS 380. To do this, the CDMA modem 340 transmits a CONNECTION REQUEST message for the packet call connection to the CDMA BTS 380 in step 470. In response to the CONNECTION REQUEST message, the CDMA BTS 380 performs operations, such as assignment of an IP address for the packet call connection, and transmits a TRAFFIC CHANNEL COMPLETE message for informing of completion of a channel connection for packet data transmission to the CDMA modem 340 in step 475. Then, a packet type path (packet bearer) is established in step 485 by the CDMA modem 340 transmitting a CALL CONNECT message for indicating the packet call connection to the WCDMA modem 350 in step 480. By doing this, the packet service which was stopped when the packet call with the WCDMA BTS 370 was disconnected can be reestablished again as a packet call connected to the CDMA BTS 380.

As described above, if the CDMA modem 340 of the multi-mode terminal succeeds in its location registration, the multi-mode terminal changes the WCDMA mode to the CDMA mode, terminates the packet service through the WCDMA modem 350, and achieves the packet call reconnection in the CDMA mode. If the packet call reconnection is achieved, the CDMA modem 340 starts to receive packet data, and a no service period is terminated, thereby performing a normal packet service. Since the packet call reconnection is achieved by making a packet service delay period closest to the time of changing to the CDMA mode, the delay period according to the packet call reconnection can be reduced to the time between when the WCDMA packet call is disconnected and when a new packet call is reconnected in the CDMA mode. If the above-described method is used, around 20~40 seconds, which is the conventional delay time according to a packet call reconnection, can be reduced to 3~5 seconds, and thus the user may not recognize that the packet service was even terminated.

Figure 5:
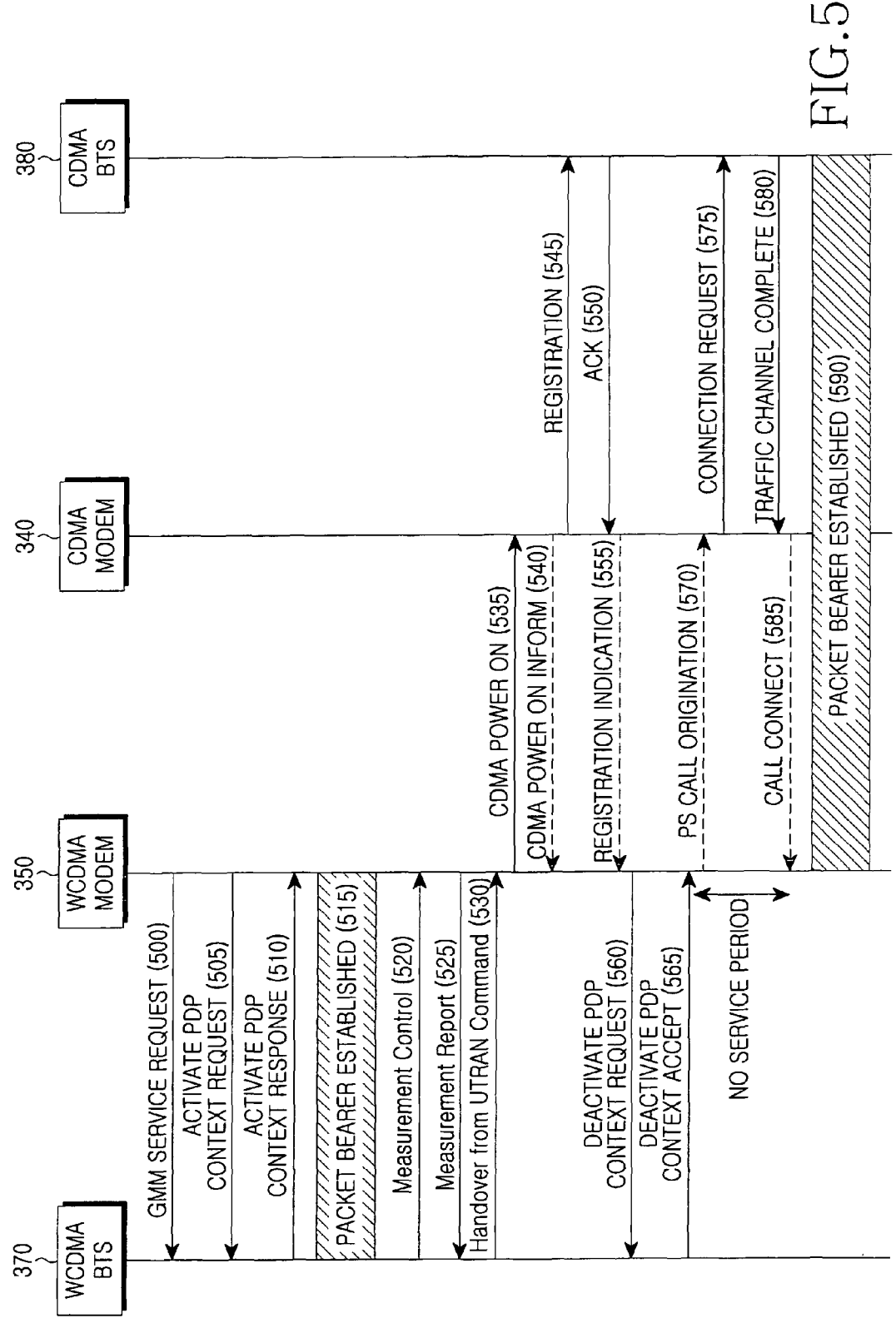
FIG. 5 is a signaling diagram illustrating a process of reconnecting a packet call according to the present invention.

A process of reconnecting a packet call according to another embodiment of the present invention begins when a multi-mode terminal transmits a MEASUREMENT REPORT message, a relevant BTS directly determines handover timing, and the relevant BTS transmits a handover command in response. FIG. 5 is a signaling diagram illustrating a process of reconnecting a packet call according to the present invention.

Referring to FIG. 5, since steps 500 to 515 are the same as steps 400 to 415 of FIG. 4, detailed description is omitted. Whether a current wireless environment satisfies a condition corresponding to a packet call reconnection time is continuously monitored between the WCDMA modem 350 and the WCDMA BTS 370 in steps 520 and 525. In detail, the WCDMA BTS 370 transmits a MEASUREMENT CONTROL message containing a condition for determining the packet call reconnection time to the WCDMA modem 350 in step 520. Herein, the MEASUREMENT CONTROL message contains a condition to determine whether the multi-mode terminal is located in a boundary area. If the multi-mode terminal is located in a boundary area, since the possibility of performing a packet call reconnection due to a handover is high, the WCDMA BTS 370 directly commands a handover command. For example, for an event generated when a new BTS signal, such as 1A, 1D, 2A, or 2C (referring to 3GPP 25.331), is received or when an existing BTS signal is less than a threshold, the WCDMA BTS 370 determines that the multi-mode terminal is located in a WCDMA boundary area. The event condition contained in the MEASUREMENT CONTROL message can be variously set according to the 3GPP 25.331 standard, and which event condition is used is previously defined by negotiation between the multi-mode terminal and a relevant BTS.

If the event condition contained in the MEASUREMENT CONTROL message is satisfied, the WCDMA modem 350 transmits a MEASUREMENT REPORT message to the WCDMA BTS 370 in step 525, and the WCDMA BTS 370 determines based on the MEASUREMENT REPORT message that the multi-mode terminal is located in a boundary area. When a packet call reconnection must be performed, the WCDMA modem 350 receives a HANDOVER FROM UTRAN (Universal Mobile Telecommunications System Radio Access Network) command for commanding a handover to the CDMA mode from the WCDMA BTS 370 in step 530. Then, the WCDMA modem 350 performs a packet call reconnection by turning on the CDMA modem 340 in a state of performing the packet call service. Since steps 535 to 590 for the packet call reconnection are the same as steps 430 to 485 of FIG. 4, a detailed description is omitted.

Figure 6:
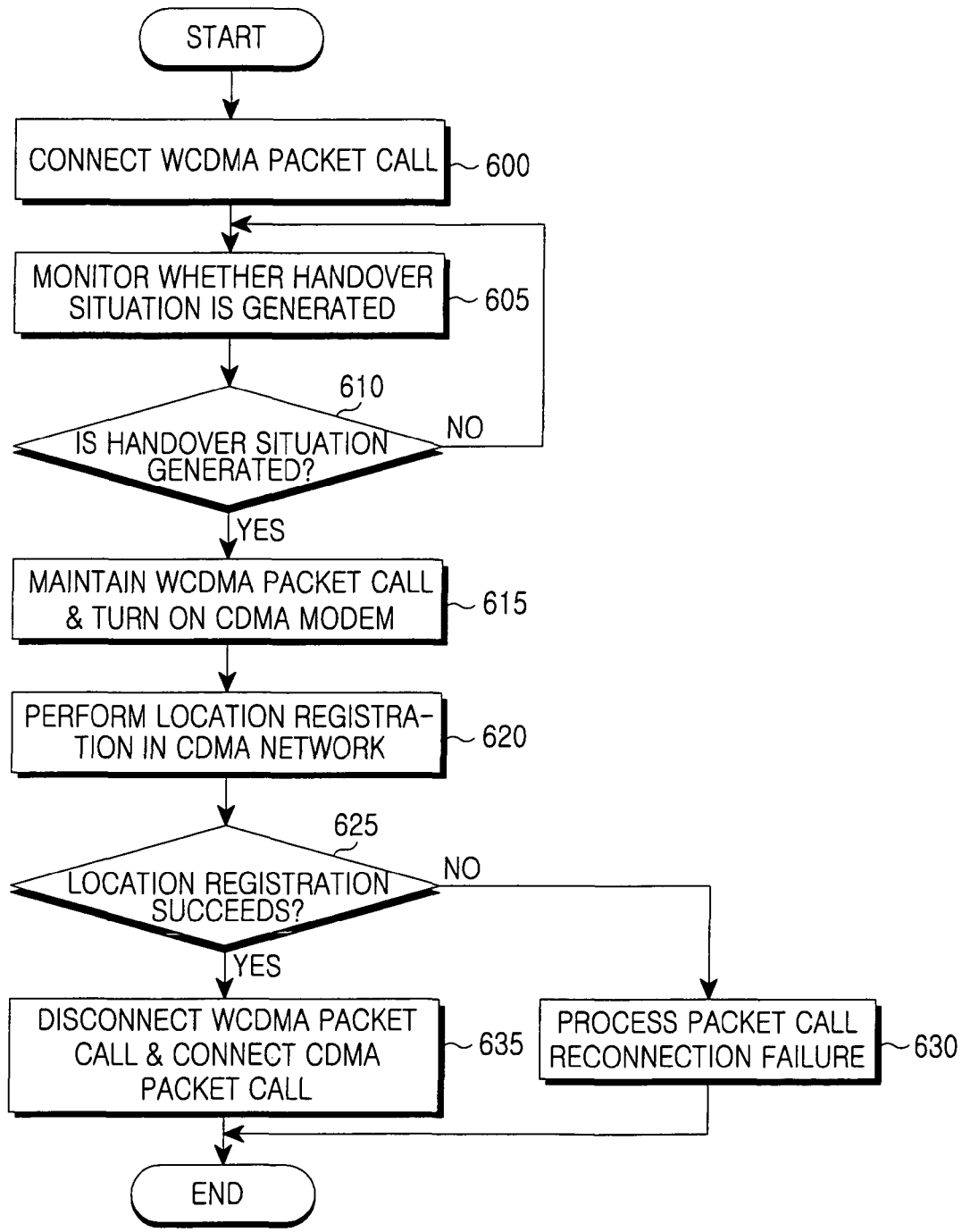
FIG. 6 is a flowchart illustrating a method of performing a packet call reconnection in a multi-mode terminal according to the present invention.

FIG. 6 is a flowchart illustrating a method of performing a packet call reconnection in a multi-mode terminal according to the present invention.

Referring to FIG. 6, the multi-mode terminal connects a WCDMA packet call in step 600, monitors in step 605 whether a handover situation is generated, and determines based on the monitoring result in step 610 whether the handover situation is generated. That is, the multi-mode terminal determines that the handover situation is generated if a packet call reconnection time contained in a MEASUREMENT CONTROL message is received from the WCDMA BTS 370. If a packet call reconnection must be performed since a handover situation is generated due to a bad wireless environment, the multi-mode terminal turns on the CDMA modem 340 in step 615 in a state of maintaining the current WCDMA packet call. Then, the multi-mode terminal performs location registration in a CDMA network using the CDMA modem 340 in step 620 and determines in step 625 whether the location registration succeeds. If the location registration succeeds, the multi-mode terminal disconnects the WCDMA packet call and connects a CDMA packet call in step 635. If the location registration fails, the multi-mode terminal performs a packet call reconnection failure process in step 630.

As described above, since the CDMA modem 340 and the WCDMA modem 350 are always connected using the 1:1 communication path 360, a switching process between modems is not required, and a handover processing time is reduced, thereby significantly reducing a packet call reconnection processing time. In addition, by using the MEASUREMENT CONTROL and MEASUREMENT REPORT messages previously negotiated with a relevant BTS without having to wait until a radio link failure event is generated, a delay time generated in measurement can be reduced. In addition, by continuously maintaining a packet service through a WCDMA network until the WCDMA modem 350 turns on the CDMA modem 340 and succeeds in its location registration in a CDMA network after WCDMA modem 350 receives a HANDOVER FROM UTRAN command in response to a MEASUREMENT REPORT message, a service delay time can be minimized. Since the multi-mode terminal does not perform an additional switching process, a path for a WCDMA packet call service can be maintained while the CDMA modem 340 is attempting its location registration.

When the CDMA modem 340 of the multi-mode terminal succeeds in its location registration by connecting to a relevant network, the WCDMA mode is changed to the CDMA mode, and therefore, a packet service of the WCDMA modem 350 is terminated, and a packet call is connected in the CDMA mode. If the packet call is connected through the above-described process, the CDMA modem 340 starts to receive packet data, and a no service period is terminated, thereby performing a normal packet service.

As described above, the present invention is implemented using a method of reconnecting a packet call by improving a packet call reconnection determination algorithm between a WCDMA system and a CDMA system and optimizing a structure of a multi-mode terminal supporting both CDMA and WCDMA in order to minimize a delay time generated when a packet call reconnection is performed in the multi-mode terminal.

As described above, a delay time necessarily generated when a packet call reconnection is performed between a WCDMA system and a CDMA system due to a traffic handover in a multi-mode terminal supporting both CDMA and WCDMA can be reduced from tens of seconds to a time period so short that a user cannot recognize termination of a packet service, e.g., a few seconds.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of minimizing a delay time of a packet call reconnection in a multi-mode terminal having first and second modems supporting different communication services, the method comprising the steps of:
   receiving, by the first modem, a condition for beginning a packet call reconnection to a second communication network during a packet service, wherein the condition is defined by a first communication network;
   determining, by the first modem, whether the received packet call reconnection start condition is satisfied by monitoring a state of the packet service through the first communication network;
   if the packet call reconnection start condition is satisfied, receiving, by the second modem, a command from the first modem to reconnect a packet call to the second communication network to perform the packet service; and
   registering, by the second modem, into the second communication network in response to the command of the first modem, and connecting the packet call to the second communication network to perform the packet service, if the registration succeeds;
   wherein the first modem determines whether a measurement control message comprising the condition is received from the first communication network, monitors whether a state of the packet service through the first communication network satisfies the packet call reconnection start condition contained in the measurement control message, and transmits a measurement report message to the first communication network if the packet call reconnection start condition is satisfied.

2. The method of claim 1, wherein registering, by the second modem, into the second communication network, comprises:
   turning on the second modem through a communication path connecting between the first and second modems;
   determining whether a registration process between the second modem and the second communication network succeeds while maintaining a packet call with the first communication network;
   if the registration process succeeds, disconnecting the packet call from the first communication network; and
   if the packet call with the first communication network is disconnected, the second modem connecting a packet call to the second communication network.

3. The method of claim 1, wherein the first communication network is a wideband code division multiple access (WCDMA) network, and the second communication network is a CDMA network, and the first modem and the second modem process signals transmitted or received through the WCDMA network and the CDMA network, respectively.

4. The method of claim 1, wherein the first communication network is a WCDMA network and the second communication network is a global systems for mobile communication (GSM) network, and the first modem and the second modem process signals transmitted or received through the WCDMA network and the GSM network, respectively.

5. The method of claim 1, wherein the packet call reconnection start condition is contained in a measurement control message received from the first communication network.

6. The method of claim 1, further comprising transmitting a measurement report message to the first communication network for informing that the packet service state is a state where a packet call reconnection to the first communication network must be performed if the packet call reconnection start condition is satisfied.

7. The method of claim 6, wherein further comprising:
receiving a handover command from a UTRAN (Universal Mobile Telecommunications System Radio Access Network) in response to the measurement report message; and
if the handover command from the UTRAN is received, reconnecting a packet call to the second communication network to perform the packet service.

8. The method of claim 5, wherein the step of determining whether the received packet call reconnection start condition is satisfied comprises:
receiving a measurement control message from the first communication network;
monitoring based on a packet call reconnection start condition contained in the measurement control message whether the multi-mode terminal is located in a boundary area; and
if the multi-mode terminal is located in a boundary area, transmitting a measurement report message to the first communication network in response to the measurement control message.

9. The method of claim 2, wherein the step of determining whether the registration process between the second modem and the second communication network succeeds, comprises:
the first modem turning on the second modem through the communication path connected between the first and second modem;
the second modem, which is turned on, registering in the second communication network; and
if the registration in the second communication network succeeds, the first modem receiving from the second modem a message for informing of the success of the registration.

10. The method of claim 2, wherein the step of performing the packet service, comprises:
if a message for informing of success of registration in the second communication network is received from the second modem, requesting for a packet call disconnect to the first communication network;
if an accept message responding to the request is received, disconnecting the packet call from the first communication network and transmitting a packet call origination message to the second modem through the communication path;
commanding the second modem to request the second communication network for a packet call connection; and
establishing a packet type path between the second modem and the second communication network to perform the packet service through the second communication network.

11. A multi-mode terminal, having first and second modems supporting different communication services, for minimizing a delay time of a packet call reconnection, comprising:
the first modem for receiving from a first communication network a condition for beginning a packet call reconnection to a second communication network during a packet service, determining whether the received packet call reconnection start condition is satisfied by monitoring a state of the packet service through the first communication network, and transmitting, to the second modem, a command to reconnect a packet call to the second communication network if the packet call reconnection start condition is satisfied, wherein the condition is defined by the first communication network, and wherein the first modem determines whether a measurement control message comprising the condition is received from the first communication network, monitors whether a state of the packet service through the first communication network satisfies the packet call reconnection start condition contained in the measurement control message, and transmits a measurement report message to the first communication network if the packet call reconnection start condition is satisfied; and
the second modem for receiving the command to reconnect the packet call to the second communication network, registering into the second communication network in response to the command of the first modem, and connecting the packet call to the second communication network to perform the packet service if the registration succeeds.

12. The multi-mode terminal of claim 11, wherein the first modem turns on the second modem through a communication path connected between the first and second modem if the packet call reconnection start condition is satisfied, determines whether a registration process between the second modem and the second communication network succeeds while maintaining a packet call with the first communication network, disconnects the packet call from the first communication network if the registration process succeeds, and allows the second modem to connect a packet call to the second communication network if the packet call with the first communication network is disconnected.

13. The multi-mode terminal of claim 11, wherein the first communication network is a wideband code division multiple access (WCDMA) network and the second communication network is a CDMA network, and the first modem and the second modem process signals transmitted or received through the WCDMA network and the CDMA network, respectively.

14. The multi-mode terminal of claim 11, wherein the first communication network is a WCDMA network and the second communication network is a global systems for mobile communication (GSM) network, and the first modem and the second modem process signals transmitted or received through the WCDMA network and the GSM network, respectively.

15. The multi-mode terminal of claim 11, wherein the first modem monitors, based on the packet call reconnection start condition contained in a measurement control message received from the first communication network, whether the multi-mode terminal is located in a boundary area, transmits a measurement report message to the first communication network in response to the measurement control message if the multi-mode terminal is located in a boundary area, and turns on the second modem if a handover command from a UTRAN (Universal Mobile Telecommunications System Radio Access Network) is received from the first communication network in response to the transmission of the measurement report message.

16. The multi-mode terminal of claim 15, wherein the first modem turns on the second modem through the communication path connected between the first and second modems if the handover command from the UTRAN is received, and disconnects the packet call from the first communication network if a message for informing of success of registration in the second communication network is received from the second modem.

17. The multi-mode terminal of claim 12, wherein the first modem requests the first communication network for a packet call disconnect if a message for informing of the success of the registration in the second communication network is received from the second modem, disconnects the packet call from the first communication network if an accept message responding to the request is received from the first communication network, and transmits a packet call origination message to the second modem through the communication path.

18. The multi-mode terminal of claim 17, wherein the second modem requests packet call connection to the second communication network if the packet call origination message is received and transmits to the first modem a message for informing of success of a packet call connection with the second communication network in response to the request if the packet call connection with the second communication network succeeds.

* * * * *